United States Patent Office 2,988,508
Patented June 13, 1961

2,988,508
COPPER CONTAINING FERRITE CORES
Pieter Geldermans, Pieter van den Ban, and Gerardus Leonardus Holthaus, all of Eindhoven, Netherlands, assignors to North American Philips Company, Inc., New York, N.Y., a corporation of Delaware
Filed Aug. 9, 1957, Ser. No. 677,265
Claims priority, application Netherlands Sept. 17, 1956
8 Claims. (Cl. 252—62.5)

Magnet cores having a hysteresis loop of approximately rectangular shape are important for various uses. This kind of cores is employed inter alia for so-called magnetic memories (see for instance W. N. Papian: "Proceedings of the Institute of Radio Engineers," April 1952, pages 475–478; D. R. Brown and E. Albers-Schoenberg: "Electronics," April 1953, pages 146–149). Such magnetic memories are used, for example, in electronic computers.

When using magnet cores as memory elements it is desirable to restrict as far as possible the occurrence of eddy currents, so that as a raw material for these cores use is more and more made of magnetically soft, oxidic materials, which exhibit, as is known, a very low electrical conductivity.

The extent to which the shape of the hysteresis loop approaches the form of a rectangle may be expressed quantitatively in various ways. This may be done, for example, by means of the quotient $B_r/B_{cl}$, wherein $B_r$ designates the remanent inductance and $B_{cl}$ the inductance at which the hysteresis loop is just closed. Another measure is the so-called squareness ratio $(R_s)_{max}$, the maximum value of $(R_s)$, this magnitude being equal to the quotient:

$$B_{(-1/2H_m)}/B_{(H_m)}$$

This quotient is a function of the maximum field intensity $H_m$ applied. At a given value of $H_m$ the quotient attains its maximum value $(R_s)_{max}$.

The criteria fixed by means of the aforesaid measures are, however, often insufficient to determine adequately the suitability of a magnet core as a memory element for use in a computer, on account of the fact that modern computers have to fulfil ever growing requirements. Therefore, use will be made hereinafter of a measure which applies in particular to computer elements, of which the switching time is not more than 2.5 μsec.

The invention will be described with reference to the accompanying drawing in which.

Figure 1:
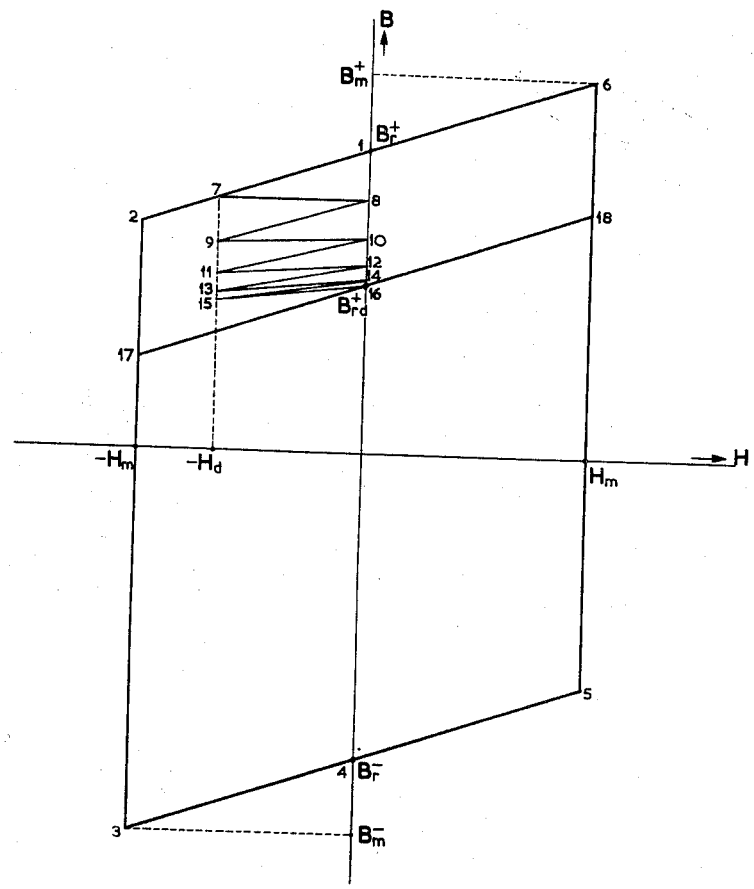
FIG. 1 is an ideal hysteresis loop with a pulse pattern superimposed thereon.

FIG. 1 shows an ideal hysteresis loop associated with a given current intensity, with which corresponds a field intensity $H_m$. $B_m^+$ designates the maximum inductance, $B_r^+$ the positive remanent inductance, $B_r^-$ the negative remanent inductance and $B_m^-$ the minimum inductance. If the magnet core is in the state of positive remanence (1), an applied field $-H_m$ will cause the path 1—7—2—17—3 to be covered. If the field is removed, the magnet core goes over to the state of negative remanence (4). With an applied field $+H_m$ the path 4—5—18—6 will then be covered and after the removal of the field the core returns to the state of positive remanence (1). If then a field $-H_d$, the absolute value of which is lower than that of the field $-H_m$, is applied, not point 2 but only point 7 is reached. This field being removed, the core goes over again to the state of remanent inductance (8), which is, however, lower than the initial remanent inductance $B_r^+$. If the latter process is repeated a few times, the paths 8—9—10, 10—11—12, 12—13—14 and so on are covered until a limit value of the remanent inductance $B_{rd}^+$ (16) is reached. From this state onwards a field $-H_m$ results in the path 16—17—3 and a field $+H_m$ results in the path 16—18—6.

Figure 2:
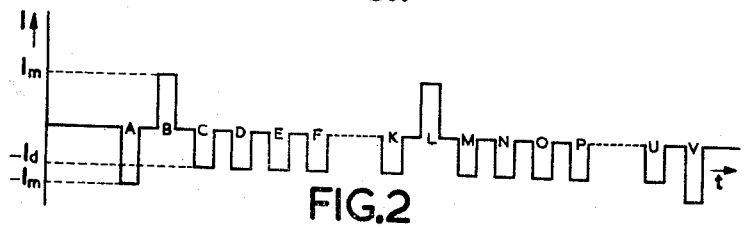
FIG. 2 is a pattern of current pulses corresponding to the pulse pattern in FIG. 1.

FIG. 2 shows a pattern of current pulses; on the abscissa is plotted the time and on the ordinate is plotted the current intensity. The absolute value of the pulse peaks A, B, L and V $(I_m)$ results in a magnetic field intensity with an absolute value $H_m$. The absolute value of the pulse peaks C, D, E, F, K, M, N, O, P and U $(I_d)$ results in a magnetic field intensity with an absolute value $H_d$. Between the positive pulses B and L and between the positive pulse L and the negative pulse V lies a number (at least 5) of negative pulses, the so-called "negative disturbing pulses."

The pulse pattern of FIG. 2 is now applied to the hysteresis loop of FIG. 1.

After the pulse A the magnet core is in the state 4 and pulse B moves it into the state 6. This results in a voltage $uV_1$ ("undisturbed one"), which corresponds to the inductance variation $B_m^+ - B_r^-$.

After the pulse K the magnet core is in the state 16 and the pulse L moves it into the state 6. This results in a voltage $dV_z$ ("disturbed zero"), which corresponds to an inductance variation $B_m^+ - B_{rd}^+$.

After the pulse U the magnet core is in the state 16 and the pulse V moves it into the state 3. This results in a voltage $rV_1$ ("read disturbed one"), which corresponds to an inductance variation $B_m^- - B_{rd}^+$.

Figure 3:
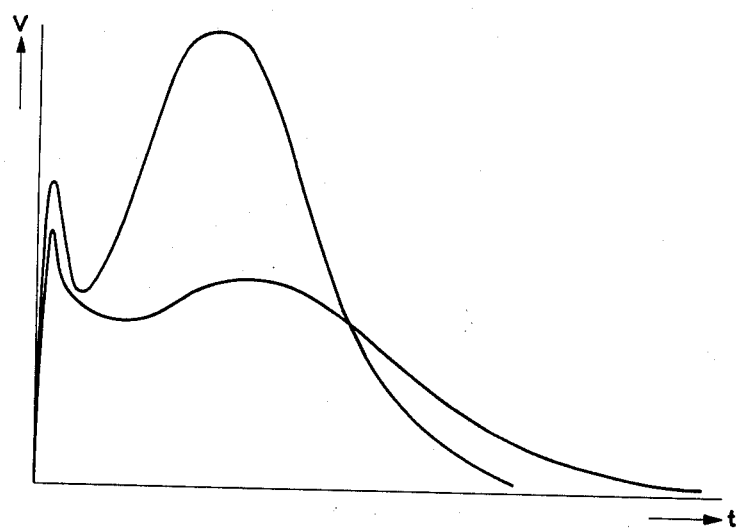
FIG. 3 shows two voltage-time characteristic curves occurring in a secondary of a transformer with a core having a square hysteresis loop.

FIG. 3 shows two voltage-time characteristic curves occurring in the secondary winding in the event of current pulses of the same rise time and different values in the primary winding (i.e. at different maximum field intensities). Each characteristic curve has two maxima. With an increase in current intensity the ratio between the first and the second maximum is reduced. The switching time is the duration of the voltage at 10% of its maximum value.

To the serviceability of a magnet core as a memory element of which the switching time is at the most 2.5 μsec. the following requirements may be applied:

(1) The maximum current intensity to be used must be as low as possible in order to require only a small power;

(2) With a given ratio between $rV_1$ and $uV_1$ or between $dV_2$ and $uV_1$ the ratio between $H_d$ and $H_m$ (between $I_d$ and $I_m$) must exceed a given value.

The value of the current intensity to be used is determined by the ratio between the first and the second maximum of the voltage in the secondary winding. With the measurements performed in accordance with the invention that current intensity was chosen with which the first maximum was 75% of the second maximum. In certain cases $rV_1$ was chosen to have a value of 75% of the value of $uV_1$. In other cases $dV_z$ was chosen to be of a value 30% of the value of $uV_1$. In these conditions a magnet core will be suitable for use as a memory element, if in addition a not too low disturbing pulse is permissible. If the absolute value of $rV_1$ is 75% of the absolute value of $uV_1$, the ratio between $I_d$ and $I_m$ is indicated by the factor $R_x$ and if the absolute value of $dV_z$ is 30% of the absolute value of $uV_1$, this ratio is indicated by the factor $R_m$. It is then required for $R_x$ or $R_m$ to be at least 0.5, which means that after a series of disturbing pulses always a value $rV_1$ will occur, which is at least equal to 75% of the value of $uV_1$ or that after a series of disturbing pulses only a value $dV_z$ can occur which is at the most equal to 30% of the value of $uV_1$, while disturbing pulses are allowed, of which the absolute value is equal to at least half of the maximum pulse in accordance with the requirements of a particular use. Although the magnitudes $R_x$ and $R_m$ cannot be directly compared with one another, it is obvious that $R_m \geq 0.5$ is a severer requirement than $R_x \geq 0.5$.

The present invention provides a method of manufacturing an annular magnet core, having an outer diameter of not more than 4 mms., particularly suitable for use as a so-called memory core in electronic computers. The magnet cores manufactured in accordance with the invention fulfill at least the requirement $R_x \geq 0.5$, while to some magnet cores applies $R_m \geq 0.5$. The cores consist of a ferromagnetic material of a definite part of the four-component system copper, manganese, iron and oxygen, the composition of this material being indicated by the ratio of the metal oxides in the starting mixture. A mixture of these oxides in a composition within the limits of 35 to 51 mol percent of $Fe_2O_3$, 35 to 62 mol percent of $MnO$, 3 to 14 mol percent of $CuO$ is first preheated at a temperature between 600° C. and 1000° C. (instead of using oxides, use may of course be made of one or more compounds which go over into oxides upon being heated). The reaction product obtained is refined and in certain cases, with the aid of a binder or without a binder, it is moulded in the form of a ring of the wanted small dimensions. In other cases, the finely divided reaction product, to which an organic binder is added, is moulded by means of an extrusion press to obtain strands, from which rings are cut. Then the rings are sintered in an oxygen-containing gas atmosphere by heating them at a temperature between 1150° C. and 1350° C., after which the sintered bodies are cooled. This cooling is performed in at least the temperature range from 700° C. to room temperature in a gaseous atmosphere having a lower oxygen content than the gas atmosphere in which the sintering took place. The sintering may, for example, be performed in air, the gaseous atmosphere of lower oxygen content than air being then an atmosphere of technical nitrogen. The sintering is preferably performed for about half an hour in a furnace, in which a temperature between 1175° C. and 1300° C. prevails, while the sintered body is allowed to cool in the furnace in the gas atmosphere of the sintering process to a temperature between 800° C. and 1000° C., after which the sintered body is cooled to room temperature within 1 to 60 minutes in the gaseous atmosphere having a lower oxygen content. Use is particularly made of a moulded body of a composition of about 44 mol percent of $Fe_2O_3$, 51 mol percent of $MnO$ and 5 mol percent of $CuO$, which is sintered in air for about half an hour in a furnace at a temperature between 1220° C. and 1250° C., after which the heating element of the furnace is put out of action and the furnace with the sintered body contained therein is allowed to cool in air to a temperature between 800° C. and 1000° C., the sintered body being finally cooled within 1 to 60 minutes to room temperature in a gaseous atmosphere having a lower oxygen content than air; the latter gaseous atmosphere may be an atmosphere of technical nitrogen.

There is already known a method of manufacturing a magnet core having a hysteresis loop of approximately rectangular shape. The shape is such that the conditions:

$$\frac{B_r}{B_{o1}} > 0.70$$

and/or $(R_s)_{max} > 0.60$ are fulfilled, while the magnet core is obtained by manufacturing it from a ferromagnetic material which consists mainly of at least one compound of copper, manganese, iron and oxygen with an atomic ratio of $Cu:Mn:Fe = x:(1-x+y):2$, wherein $x = 0.05-0.2$ and $y < 0.7$. The sintering is performed in air or in a gaseous atmosphere having a higher oxygen content than air at a temperature between 1300° C. and 1400° C. As stated above, the criteria $$\frac{B_r}{B_{o1}} > 0.70$$

and/or $(R_s)_{max} > 0.60$ are not always sufficient to determine the serviceability of a magnet core as a memory element in the most modern computers. The present invention provides a specialized method of manufacturing a magnet core suitable for this purpose, having an outer diameter of not more than 4 mms.

It should be noted that a method is known to improve the rectangular shape of the hysteresis loop of ferrites with spinel structure to be used for a memory storage device. This method consists in that the sintered magnet core is subjected to a second heating in an atmosphere of water vapour or an inert gas at a temperature which is lower than the temperature at which the magnet core was sintered during the first heating process. As an alternative, the second heating process may be carried out in vacuo. Uses of this method are known only with respect to ferrites of a given part of the four-component system of Mg—Mn—Fe—O. The present invention is restricted to materials of a given part of the four-component system of Cu—Mn—Fe—O, and the essential feature of the method is that during the cooling to a temperature of at least 700° C. the oxygen-containing gas atmosphere is replaced by an atmosphere having a lower oxygen content.

EXAMPLE 1

A mixture of copper oxide $CuO$, manganese carbonate $MnCO_3$ and iron oxide $Fe_2O_3$ is ground in alcohol in a ball mill for two hours and after drying preheated in air for one hour. After cooling the reaction product is ground in alcohol for 16 hours and dried, after which the ground product is moulded to obtain rings with an outer diameter of about 2.2 mms. and an inner diameter of about 1.4 mms. These rings are heated in air for about half an hour, after which the heating element of the furnace is put out of action and the rings are cooled in air in the furnace to a given temperature. Then the air is replaced by a gaseous atmosphere of technical nitrogen, in which the rings are cooled to room temperature within about 10 minutes. In some cases the cooling is performed completely in technical nitrogen.

The magnet cores thus obtained and provided with one primary winding and one secondary winding are tested with the aid of the pulse pattern shown diagrammatically in Fig. 2, the pulse duration being actually 5 $\mu$sec. and the time between two successive pulses being about 200 $\mu$sec., while the rise time takes 0.2 $\mu$sec. The relative value of the disturbing pulses is increased for certain cores to such a value that the value of the voltage $rV_1$ is 75% of the value of the voltage $uV_1$, so that the ratio $I_d/I_m = R_x$. For other cores the disturbing pulses are increased to such a value that the value of the voltage $dV_z$ is 30% of the value of the voltage $uV_1$, so that the ratio $I_d/I_m = R_m$. The method of manufacturing and the properties of these rings are indicated in Table I.

Table I

| mol. percent | | | preheating temp., °C. | firing temp., °C. | cooling temp., °C. | $R_x$ | $R_m$ | $I_m$, ma. | $T_s$, μsec. |
|---|---|---|---|---|---|---|---|---|---|
| CuO | MnO | Fe₂O₃ | | | | | | | |
| 5 | 51 | 44 | 600 | 1,220 | 900 | ------ | 0.52 | 770 | 0.8 |
| 5 | 51 | 44 | 600 | 1,250 | 900 | ------ | 0.50 | 635 | 1.2 |
| 5 | 51 | 44 | 600 | 1,220 | 1,220 | ------ | 0.50 | 880 | 0.7 |
| 5 | 51 | 44 | 650 | 1,250 | 800 | ------ | 0.56 | 950 | 0.9 |
| 5 | 51 | 44 | 650 | 1,220 | 900 | ------ | 0.57 | 700 | 1.0 |
| 5 | 51 | 44 | 700 | 1,220 | 800 | ------ | 0.55 | 820 | 1.0 |
| 5 | 51 | 44 | 700 | 1,250 | 900 | ------ | 0.56 | 650 | 1.2 |
| 5 | 51 | 44 | 700 | 1,220 | 900 | ------ | 0.57 | 720 | 0.9 |
| 5 | 51 | 44 | 800 | 1,250 | 900 | ------ | 0.54 | 720 | 1.1 |
| 5 | 51 | 44 | 800 | 1,220 | 900 | ------ | 0.53 | 617 | 1.4 |
| 5 | 51 | 44 | 800 | 1,250 | 1,250 | ------ | 0.54 | 600 | 1.5 |
| 5 | 51 | 44 | 900 | 1,220 | 900 | ------ | 0.50 | 600 | 1.6 |
| 5 | 51 | 44 | 1,000 | 1,220 | 1,000 | ------ | 0.51 | 650 | 1.6 |
| 5 | 51 | 44 | 900 | 1,175 | 1,000 | 0.68 | ------ | 1,200 | 0.7 |
| 5 | 51 | 44 | 900 | 1,200 | 1,000 | 0.63 | ------ | 1,000 | 0.8 |
| 5 | 51 | 44 | 900 | 1,275 | 1,000 | 0.53 | ------ | 540 | 1.7 |
| 5 | 51 | 44 | 900 | 1,300 | 1,000 | 0.50 | ------ | 560 | 1.8 |
| 9 | 47 | 44 | 800 | 1,250 | 875 | ------ | 0.59 | 640 | 1.3 |
| 5 | 45 | 50 | 900 | 1,175 | 1,000 | 0.68 | ------ | 1,300 | 0.7 |
| 5 | 45 | 50 | 900 | 1,200 | 1,000 | 0.60 | ------ | 920 | 0.9 |
| 5 | 45 | 50 | 900 | 1,225 | 1,000 | 0.55 | ------ | 590 | 1.7 |
| 5 | 45 | 50 | 900 | 1,250 | 1,000 | 0.51 | ------ | 530 | 1.8 |
| 5 | 45 | 50 | 900 | 1,275 | 1,000 | 0.55 | ------ | 500 | 1.7 |
| 5 | 45 | 50 | 900 | 1,300 | 1,000 | 0.50 | ------ | 550 | 1.6 |
| 5 | 48 | 47 | 900 | 1,175 | 1,000 | 0.68 | ------ | 1,200 | 0.7 |
| 5 | 48 | 47 | 900 | 1,200 | 1,000 | 0.68 | ------ | 1,150 | 0.6 |
| 5 | 48 | 47 | 900 | 1,250 | 1,000 | 0.53 | ------ | 470 | 2.0 |
| 5 | 48 | 47 | 900 | 1,275 | 1,000 | 0.52 | ------ | 500 | 1.8 |
| 5 | 48 | 47 | 900 | 1,300 | 1,000 | 0.50 | ------ | 540 | 1.7 |
| 4 | 54 | 42 | 900 | 1,175 | 1,000 | 0.68 | ------ | 1,200 | 0.7 |
| 4 | 54 | 42 | 900 | 1,200 | 1,000 | 0.63 | ------ | 1,100 | 0.8 |
| 4 | 54 | 42 | 900 | 1,225 | 1,000 | 0.52 | ------ | 600 | 1.7 |
| 4 | 54 | 42 | 900 | 1,250 | 1,000 | 0.50 | ------ | 540 | 1.8 |
| 4 | 54 | 42 | 900 | 1,275 | 1,000 | 0.50 | ------ | 550 | 1.7 |
| 4 | 54 | 42 | 900 | 1,300 | 1,000 | 0.50 | ------ | 560 | 1.7 |
| 4 | 60 | 36 | 900 | 1,175 | 1,000 | 0.68 | ------ | 1,100 | 0.6 |
| 4 | 60 | 36 | 900 | 1,225 | 1,000 | 0.66 | ------ | 900 | 0.9 |
| 4 | 60 | 36 | 900 | 1,250 | 1,000 | 0.55 | ------ | 500 | 2.1 |
| 4 | 60 | 36 | 900 | 1,275 | 1,000 | 0.60 | ------ | 450 | 1.9 |
| 11 | 44.5 | 44.5 | 900 | 1,250 | 800 | 0.55 | ------ | 740 | 2.2 |
| 11 | 44.5 | 44.5 | 900 | 1,250 | 900 | 0.58 | ------ | 720 | 1.2 |
| 11 | 44.5 | 44.5 | 900 | 1,250 | 1,000 | 0.51 | ------ | 780 | 1.6 |
| 11 | 44.5 | 44.5 | 900 | 1,250 | 1,100 | 0.50 | ------ | 860 | 1.6 |

EXAMPLE 2

Magnet cores are manufactured in the manner described in Example 1, the only difference being that the rings are formed by adding a small quantity of an organic binder to the preheated, reground and dried reaction product; by means of an extrusion press and strand having an outer diameter of about 2 mms. and an inner diameter of about 1.3 mms. is moulded therefrom, from which are cut rings. The rings are tested in the manner described in Example 1.

The method of manufacturing and the properties of these rings are indicated in Table II.

Table II

| mol. percent | | | preheating temp., °C. | firing temp., °C. | cooling temp., °C. | $R_x$ | $I_m$, ma. | $T_s$, μsec. |
|---|---|---|---|---|---|---|---|---|
| CuO | MnO | Fe₂O₃ | | | | | | |
| 12.5 | 37.5 | 50 | 900 | 1,190 | 1,000 | 0.55 | 940 | 1.0 |
| 12.5 | 37.5 | 50 | 900 | 1,205 | 1,000 | 0.55 | 920 | 1.2 |
| 12.5 | 37.5 | 50 | 900 | 1,225 | 1,000 | 0.53 | 700 | 1.9 |
| 12 | 41 | 47 | 900 | 1,190 | 1,000 | 0.55 | 1,000 | 1.0 |
| 12 | 41 | 47 | 900 | 1,225 | 1,000 | 0.53 | 630 | 2.0 |
| 11 | 44.5 | 44.5 | 900 | 1,190 | 1,000 | 0.63 | 1,050 | 0.8 |
| 11 | 44.5 | 44.5 | 900 | 1,225 | 1,000 | 0.53 | 580 | 1.8 |
| 11 | 47 | 42 | 900 | 1,190 | 1,000 | 0.70 | 1,100 | 0.7 |
| 11 | 47 | 42 | 900 | 1,205 | 1,000 | 0.60 | 850 | 1.2 |
| 11 | 47 | 42 | 900 | 1,225 | 1,000 | 0.53 | 560 | 2.1 |
| 9 | 55 | 36 | 900 | 1,190 | 1,000 | 0.72 | 1,140 | 0.7 |
| 9 | 55 | 36 | 900 | 1,205 | 1,000 | 0.63 | 920 | 0.9 |

What is claimed is:

1. A method of manufacturing an annular core having an outer diameter of not more than 4 mms. and having a substantially square hysteresis loop comprising the steps, forming a mixture of copper, manganese and ferric oxides in the proportions of about 35 to 51 mol percent of Fe₂O₃, 35 to 62 mol percent of MnO and 3 to 14 mol percent of CuO, heating said mixture to a temperature of about 600 to 1000° C. to form a reaction product, finely-dividing said reaction product, molding the finely-divided reaction product into an annular body of desired dimensions, heating said annular body in an atmosphere containing at least as much oxygen as air at a temperature of about 1150 to 1350° C. to sinter said body, and cooling said body in about 1 to 60 minutes from at least 700° C. to ambient temperature in an atmosphere containing about as much oxygen as technical nitrogen.

2. A method of manufacturing an annular core having an outer diameter of not more than 4 mms. and having a substantially square hysteresis loop comprising the steps, forming a mixture of copper, manganese and ferric oxides in the proportions of about 35 to 51 mol percent of Fe₂O₃, 35 to 62 mol percent of MnO and 3 to 14 mol percent of CuO, heating said mixture to a temperature of about 600 to 1000° C. to form a reaction product, finely-dividing said reaction product, molding the finely-divided reaction product into an annular body of desired dimensions, heating said annular body in an atmosphere containing at least as much oxygen as air at a temperature of about 1150 to 1350° C. to sinter said body, and cooling said body in about 1 to 60 minutes from at least 700°

C. to ambient temperature in an atmosphere of technical nitrogen.

3. A method of manufacturing an annular core having an outer diameter of not more than 4 mms. and having a substantially square hysteresis loop comprising the steps, forming a mixture of copper, manganese and ferric oxides in the proportions of about 35 to 51 mol percent of $Fe_2O_3$, 35 to 62 mol percent of MnO and 3 to 14 mol percent of CuO, heating said mixture to a temperature of about 600 to 1000° C. to form a reaction product, finely-dividing said reaction product, molding the finely-divided reaction product into an annular body of desired dimensions, heating said annular body for about one-half hour in an atmosphere containing at least as much oxygen as air at a temperature of about 1175 to 1300° C. to sinter said body, and cooling said body in about 1 to 60 minutes from at least 700° C. to ambient temperture in an atmosphere of technical nitrogen.

4. A method of manufacturing an annular core having an outer diameter of not more than 4 mms. and having a substantially square hysteresis loop comprising the steps, forming a mixture of copper, manganese and ferric oxides in the proportions of about 35 to 51 mol percent of $Fe_2O_3$, 35 to 62 mol percent of MnO and 3 to 14 mol percent of CuO, heating said mixture to a temperature of about 600 to 1000° C. to form a reaction product, finely-dividing said reaction product, molding the finely-divided reaction product into an annular body of desired dimensions, heating said annular body in an atmosphere containing at least as much oxygen as air at a temperature of about 1175 to 1300° C. to sinter said body, cooling said body to a temperature of about 800 to 1000° C. in air, and thereafter cooling said body to ambient temperature in about 1 to 60 minutes in an atmosphere of technical nitrogen.

5. A method of manufacturing an annular core having an outer diameter of not more than 4 mms. and having a substantially square hysteresis loop comprising the steps, forming a mixture of copper, manganese and ferric oxides in the proportions of about 44 mol percent of $Fe_2O_3$, 51 mol percent of MnO and 5 mol percent of CuO, heating said mixture to a temperature of about 600 to 1000° C. to form a reaction product, finely-dividing said reaction product, molding the finely-divided reaction product into an annular body of desired dimensions, heating said annular body for about one-half hour in an air atmosphere at a temperature of about 1220 to 1250° C. to sinter said body, cooling said body in air to a temperature of said body about 800 to 1000° C., and thereafter cooling said body to ambient temperature in about 1 to 60 minutes in an atmosphere of technical nitrogen.

6. An annular ferromagnetic ferrite core having a substantially square hysteresis loop, said core having at least one of the following properties:

$$R_x \geq 0.5 \quad \text{and} \quad R_m \geq 0.5$$

said core having an outer diameter not exceeding about 4 mms. and consisting essentially of the reaction product obtained by firing a mixture of about 35 to 51 mol percent of $Fe_2O_3$, about 35 to 62 mol percent of MnO, and about 3 to 14 mol percent of CuO in atmosphere containing at least as much oxygen as air at a temperature of about 1300° to 1400° C., followed by cooling the reaction product in about 1 to 60 minutes from about 700° C. in an atmosphere containing about as much oxygen as technical nitrogen.

7. An annular ferromagnetic ferrite core having a substantially square hysteresis loop, said core having at least one of the following properties:

$$R_x \geq 0.5 \quad \text{and} \quad R_m \geq 0.5$$

said core having an outer diameter not exceeding about 4 mms. and consisting essentially of the reaction product obtained by firing a mixture of about 44 mol percent of $Fe_2O_3$, about 51 mol percent of MnO, and about 5 mol percent of CuO in atmosphere containing at least as much oxygen as air at a temperature of about 1300° to 1400° C., followed by cooling the reaction product in about 1 to 60 minutes from about 700° C. in an atmosphere containing about as much oxygen as technical nitrogen.

8. An annular ferromagnetic ferrite core having a substantially square hysteresis loop, said core having at least one of the following properties:

$$R_x \geq 0.5 \quad \text{and} \quad R_m \geq 0.5$$

said core having an outer diameter not exceeding about 4 mms. and consisting essentially of the reaction product obtained by firing a mixture of about 35 to 51 mol percent of $Fe_2O_3$, about 35 to 62 mol percent of MnO, and about 3 to 14 mol percent of CuO in atmosphere of air at a temperature of about 1300° to 1400° C., followed by cooling the reaction product in about 1 to 60 minutes from about 700° C. in an atmosphere of technical nitrogen.

References Cited in the file of this patent
UNITED STATES PATENTS

| | | |
|---|---|---|
| 2,636,860 | Snoek et al. | Apr. 28, 1953 |
| 2,818,387 | Beck et al. | Dec. 31, 1957 |

FOREIGN PATENTS

| | | |
|---|---|---|
| 508,079 | Belgium | June 28, 1952 |
| 729,538 | Great Britain | May 4, 1955 |
| 730,703 | Great Britain | May 25, 1955 |
| 1,116,334 | France | Jan. 30, 1956 |

OTHER REFERENCES

Wijn et al.: Philips Tech. Rev., vol. 16, No. 2, pp. 55, 56, August 1954.

Snoek: Physica III, No. 6, pp. 469–474, 481, 482, June 1936.

Gorter: Proceedings of the IRE, December 1955, p. 1960.